United States Patent
Miyaki

(12) 
(10) Patent No.: US 6,571,169 B2
(45) Date of Patent: May 27, 2003

(54) DESTINATION INPUT METHOD IN NAVIGATION SYSTEM AND NAVIGATION SYSTEM

(75) Inventor: Ken Miyaki, Los Angeles, CA (US)

(73) Assignee: Alpine Electronics, Inc., Tokyo (JP)

(*) Notice: Subject to any disclaimer, the term of this patent is extended or adjusted under 35 U.S.C. 154(b) by 137 days.

(21) Appl. No.: 09/809,803

(22) Filed: Mar. 16, 2001

(65) Prior Publication Data

US 2002/0133289 A1 Sep. 19, 2002

(51) Int. Cl.[7] ................................................ G01C 21/26
(52) U.S. Cl. ..................... 701/200; 701/201; 701/209; 701/211; 701/25; 340/995; 345/851
(58) Field of Search ................................. 701/200, 207, 701/208, 209, 202, 211, 25, 201; 340/988, 990, 998; 707/4, 100; 345/848, 850, 851

(56) References Cited

U.S. PATENT DOCUMENTS

| | | | | |
|---|---|---|---|---|
| 5,680,312 A | * | 10/1997 | Oshizawa et al. | 701/202 |
| 5,819,200 A | * | 10/1998 | Tamai et al. | 340/990 |
| 5,832,408 A | * | 11/1998 | Tamai et al. | 340/990 |
| 5,987,375 A | * | 11/1999 | Tamai | 340/990 |
| 6,081,803 A | * | 6/2000 | Ashby et al. | 340/990 |
| 6,112,200 A | * | 8/2000 | Livshutz et al. | 701/201 |
| 6,184,823 B1 | * | 2/2001 | Smith et al. | 342/357.13 |
| 6,259,987 B1 | * | 7/2001 | Ceylan et al. | 340/990 |
| 6,336,111 B1 | * | 1/2002 | Ashby et al. | 701/208 |

* cited by examiner

Primary Examiner—Jacques H. Louis-Jacques
(74) Attorney, Agent, or Firm—Brinks Hofer Gilson & Lione

(57) ABSTRACT

When specifying a Point of Interest (POI) as a destination in a navigation system, a relation between a POI and associated POIs is defined as a parentage. Detailed information such as polygon data, address, position, etc., is stored for a POI, and if the POI is a parent, a list of the child POIs or polygon data thereof also is stored. In setting a destination, the navigation system: (1) displays the detailed information and the polygon of the parent, and when a parent POI is selected from the POI list, (2) displays a list of the child POIs or polygons of the child POIs as requested, and (3) specifies a child POI from the list of the child POIs or the polygons of the child POIs to input a destination.

12 Claims, 6 Drawing Sheets

DESTINATION INPUT METHOD IN NAVIGATION SYSTEM AND NAVIGATION SYSTEM

BACKGROUND OF THE INVENTION

The present invention relates to a destination input method in a navigation system, whereby, when a category is inputted, Points of Interest (POI) belonging to the category are displayed in the form of a list, and a destination POI is selected from the POI list to thereby input a destination.

A navigation system for giving travel guidance to a vehicle driver whereby the driver can easily reach a desired destination detects the position of the vehicle, and reads map data for the area surrounding the vehicle position from a map storage medium, such as a CD-ROM, DVD, etc. In the MAP GUIDE MODE, the navigation system draws the map and the guide route on the display screen, and superimposes a vehicle position mark at a specific location on the map. As the present vehicle position varies with movement of the vehicle, the system moves the vehicle position mark along the guide route, or scrolls the map with the vehicle position mark fixed at a specific position, so that the driver can see a detailed map surrounding the vehicle position at a single glance. In the ARROW GUIDE MODE, the guide route, the roads intersecting the guide route, etc., are displayed in a simplified manner; the travel direction at an intersection is displayed by an arrow; the distance to the intersection, direction toward the destination, distance to the destination, etc., are displayed; and, further, the travel direction at the intersection is guided by voice output.

In order to set the route guidance in the MAP GUIDE MODE or the ARROW GUIDE MODE, the driver must input a destination, so that the system can search a guide route to the destination. Following are methods to input a destination:

(1) directly inputting the address of a destination,
(2) in the case of a destination being an intersection, specifying two streets and inputting the intersection,
(3) inputting the Place Name of a POI as the destination,
(4) inputting the Place Type (category) of a POI as the destination to display a candidate list for the Place Name, and selecting a destination Place Name from the candidate list,
(5) displaying the latest destinations of n number, and selecting a current destination from among them,
(6) selecting a destination from places registered beforehand in the address book,
(7) specifying a destination directly on the map with the cursor, and
(8) inputting the telephone number of a destination POI.

When inputting a destination by method (4), the user operates the menu key on the remote control unit to display the main menu on the screen (refer to FIG. 6(a)), and selects the menu item "Dest" from the main menu.

Then, the navigation system displays the screen "Find Destination by" for specifying the destination input method, as shown in FIG. 6(b). If the user selects the menu item "Point of Interest", the navigation system will display the menu items, "Place Name", "Place Type", as shown in FIG. 6(c). If the user selects the menu item "Place Type", the navigation system will display the screen "Select Category", which is a category list as shown in FIG. 6(d). With the selection of a specific category (for example, shopping) from the category list, the navigation system displays an alphabet/numeric keyboard for inputting the city names, as shown in FIG. 6(e). The spelling i of only the leading few characters of the city name by the user will display a list of the city names having the inputted spelling, which can be scrolled. Then, the user selects a desired city name (for example, Costa Mesa) from this list, or inputs the entire spelling of the city name. In response to the input of the city name, the navigation system displays the list of all the POI of the specified category that exist in the city to be scrollable as shown in FIG. 6(f). If the user selects a desired POI (for example, Triangle Square) from the POI list, the navigation system will display the name, address, telephone number, and the like of the POI. When the POI is acceptable as the destination, the user selects "OK to Proceed" to select the destination. Thereafter, the navigation system searches a guide route to the destination from the present vehicle position for display.

In the process mentioned above, if the user selects a desired POI (for example, baseball stadium, airport, shopping mall, etc.), a conventional navigation system will not display a POI associated with the desired POI (for example, parking lots belonging to the baseball stadium or the airport, or individual tenants in the shopping mall); and the system does not permit the user to view information of the associated POI or set the associated POI as the destination.

SUMMARY OF THE INVENTION

Accordingly, an object of the invention is to make it possible to display POI information associated with a selected POI and set an associated POI as a destination.

In accordance with the invention, the above object can be achieved by defining a relation between a POI and parking lots for the POI, a relation between a POI and tenants in the POI, and the like as a parentage, with each POI being associated with detailed information of polygon data, address, position, etc. If the POI is a parent, it is associated with a list of child POIs or polygon data thereof, and when a parent POI is selected, (1) the detailed information and a polygon of the parent are displayed, (2) a list of the child POIs or polygon data of the child POIs are displayed as requested, (3) a child POI is selected from the list of child POIs or the polygon data of the child POIs to input a destination.

Other features and advantages of the present invention will be apparent from the following description taken in conjunction with the accompanying drawings.

BRIEF DESCRIPTION OF THE DRAWINGS

DETAILED DESCRIPTION OF THE INVENTION (A) Configuration of the Navigation System FIG. 1 is a block diagram illustrating a navigation system according to this invention. In the drawing, 11 signifies a map storage medium that contains map information, for example, a CD-ROM, 12 a CD-ROM controller that reads the map information from the CD-ROM, 13 a position measuring device that measures a present vehicle position and includes a speed sensor to detect a travel distance, a gyro to detect a travel direction, a CPU for position calculation, a GPS receiver, etc. Further, 14 signifies a map information memory to store map information read from the CD-ROM, 15 a POI database memory to store POI database information read from the CD-ROM.

Figure 2:
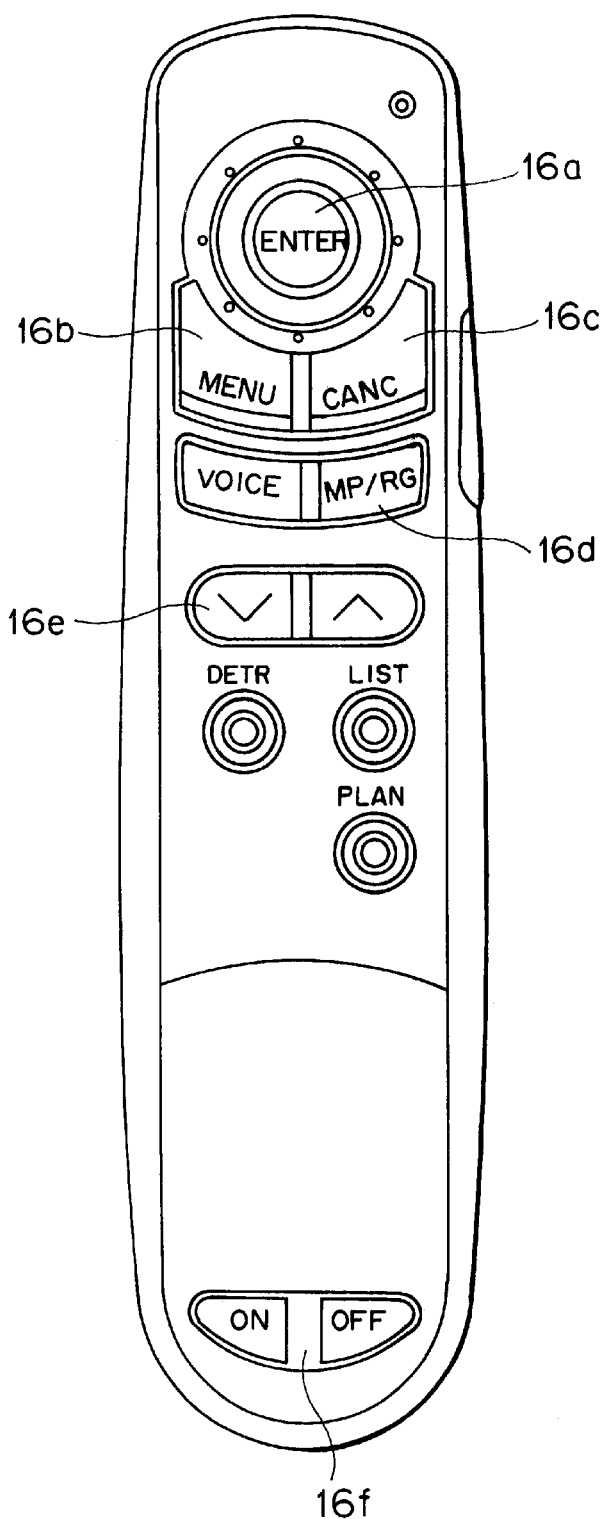
FIG. 2 is an illustration of a remote control unit of the navigation system.

16 denotes a remote control unit that performs the operations of menu selection, expansion/reduction, destination input, etc., 17 a remote control interface. The remote control unit 16 comprises, as shown in FIG. 2, a joy stick/enter key 16a, menu key 16b, cancel key 16c, MP/RG key 16d, zoom/scroll key 16e, monitor on/off key 16f, etc. The joy stick/enter key 16a has a function as the joy stick key that moves the cursor and vehicle mark, etc., in eight directions relative to the map, or moves the menu bar (highlight position) when selecting a desired menu entry, and a function as the enter key that selects a focusing position, or selects a menu. The menu key 16b is operated to display the main menu, the cancel key 16c is operated to cancel the current display, or to recover the previous display of the menu. The MP/RG key 16d is operated to switch between MAP GUIDE MODE and ARROW GUIDE MODE, and the zoom/scroll key 16e is operated to perform expansion/reduction of a map, up/down shifting, and scrolling of a highlight position in various lists.

Figure 1:
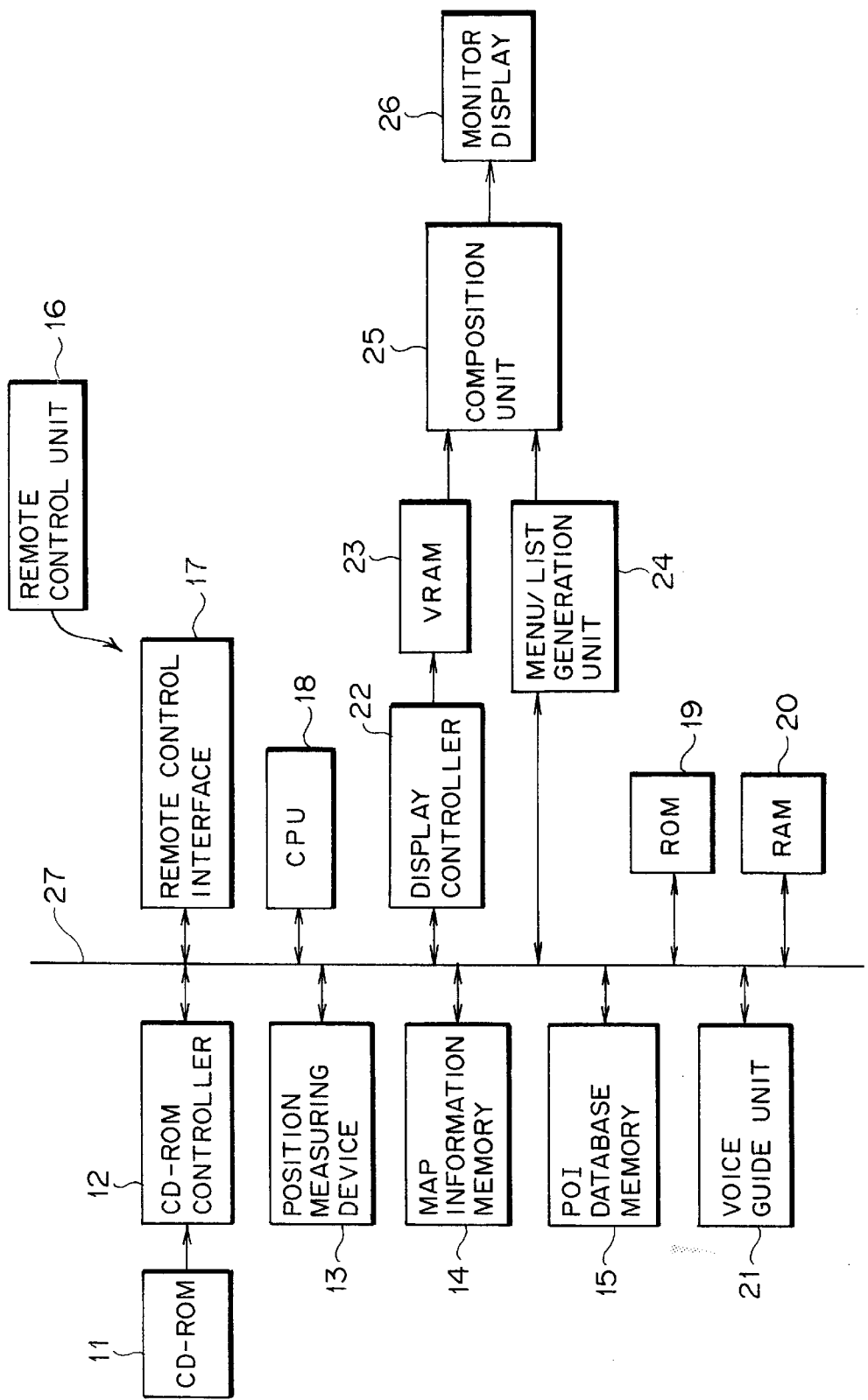
FIG. 1 is a block diagram illustrating a navigation system according to the present invention.

To return to FIG. 1, 18 denotes a processor (CPU) that controls the entire navigation system, 19 a ROM that stores various control programs, 20 a RAM that stores guide routes and processed results, etc., 21 a voice guide unit that guides the travel direction at a point of intersection by voice output, 22 a display controller that generates a MAP GUIDE image or an ARROW GUIDE image based on the map information, 23 a VRAM that stores the images generated by the display controller, 24 a menu/list generation unit that generates menu images/list images, 25 a composition unit, 26 a monitor display, and 27 a bus line.

(B) POI Database Configuration

The POI database memory 15 stores multiple POI in association with various categories (hotels, restaurants, airports, stations, shopping malls, sporting facilities, hospitals, golf courses, etc.), and stores in association with each POI (1) polygon data of the POI, (2) position data (longitude/latitude) of the POI, (3) detailed information (name, address, category, etc.) of the POI, and (4) a list or polygon data of the child POIs, if the POI is a parent.

A POI and parking lots for the POI, or a POI and tenants in the POI, which are logically related, are defined as a parentage. The former is named a parent POI, and the latter is named a child POI. Although they may be physically separated, if they are logically related with each other, they are regarded as forming a parentage.

Figure 3A:
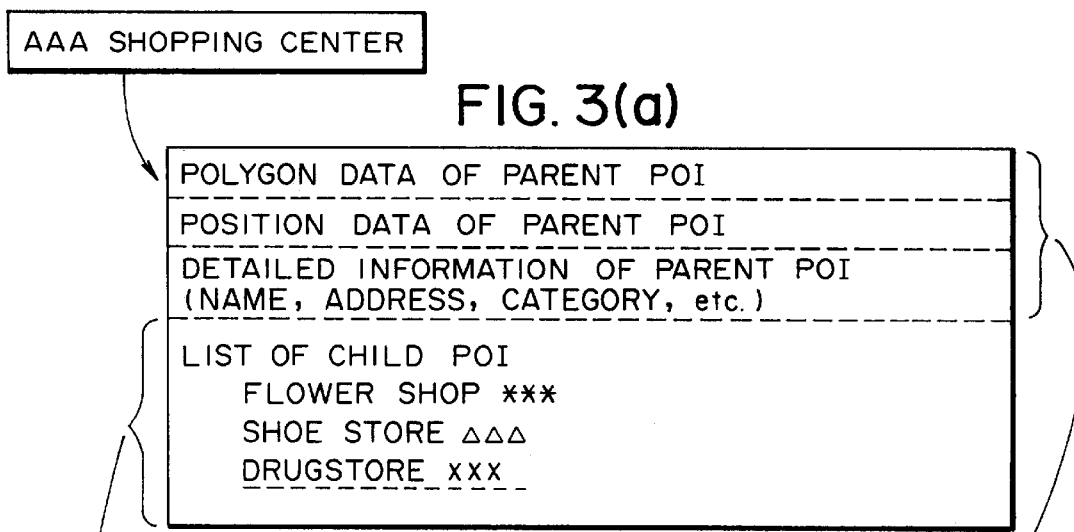
FIGS. 3A–3C are charts explaining a first example of POI data.
Figure 3B:
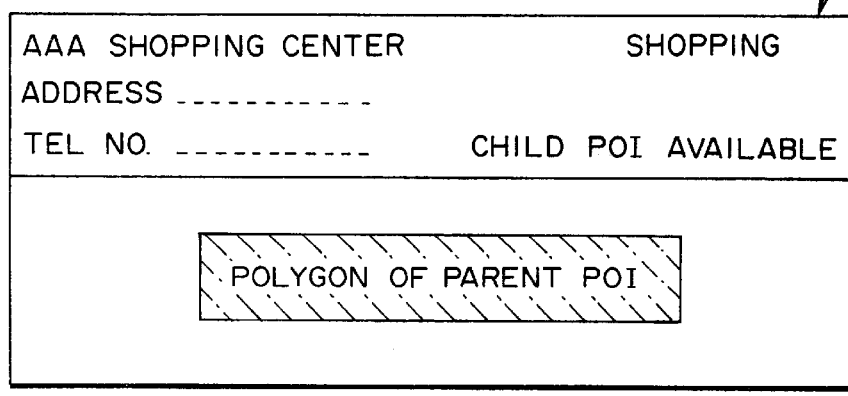
Figure 3C:
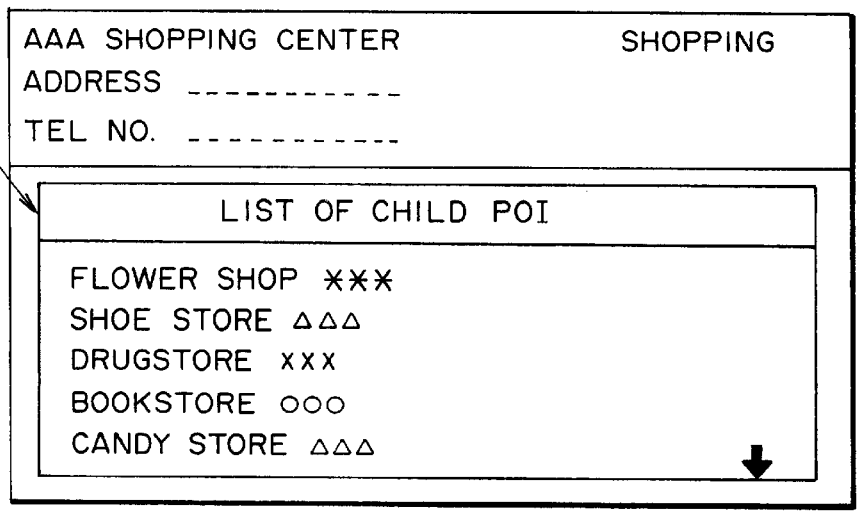

FIG. 3(*a*) is a first example of data associated with a POI, in which the child POIs are designated by a list. In this case, the parent POI, AAA shopping center, is associated with:

(1) polygon data of AAA shopping center, (2) position (longitude/latitude) data of AAA shopping center, (3) detailed information (name, address, category, etc.) of AAA shopping center, and (4) a list of tenants being the child POIs.

Figure 4A:
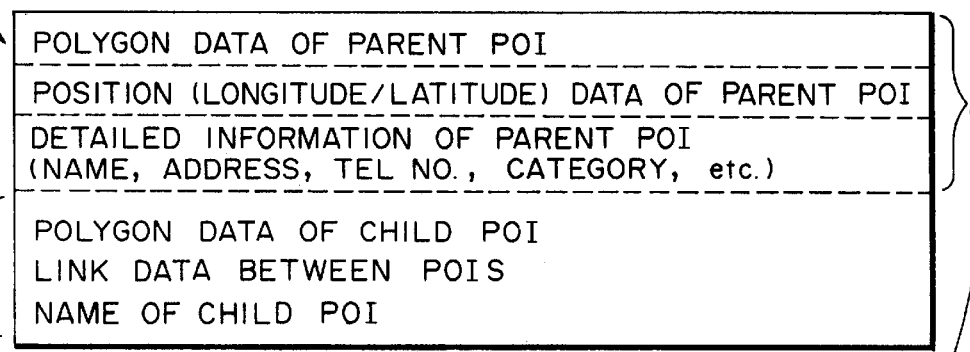
FIGS. 4A–C are charts explaining a second example of POI data.
Figure 4B:
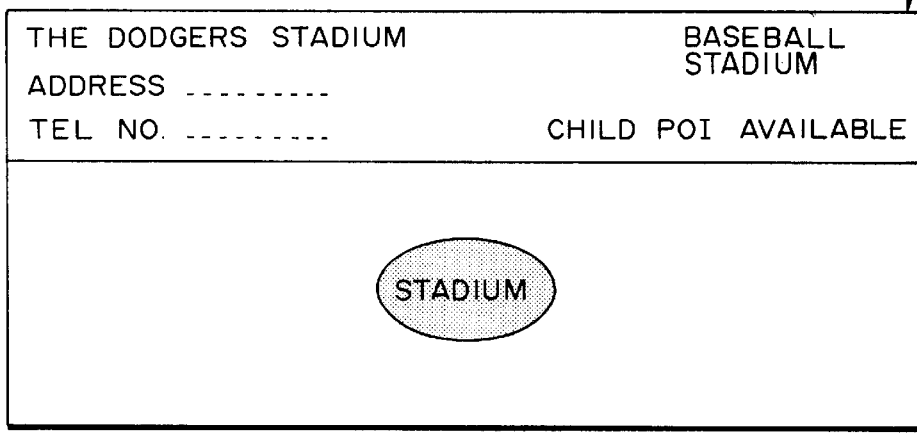

FIG. 4(*a*) is a second example of data associated with a POI, in which the child POIs are designated by a polygon. In this case, the parent POI, the Dodgers stadium, is associated with:

(1) polygon data of the Dodgers stadium, (2) position (longitude/latitude) data of the Dodgers stadium, (3) detailed information (name, address, category, etc.) of the Dodgers stadium, and (4) polygon data, link data, and name of each child POI.

(C) Destination Input Processing

Figure 5:
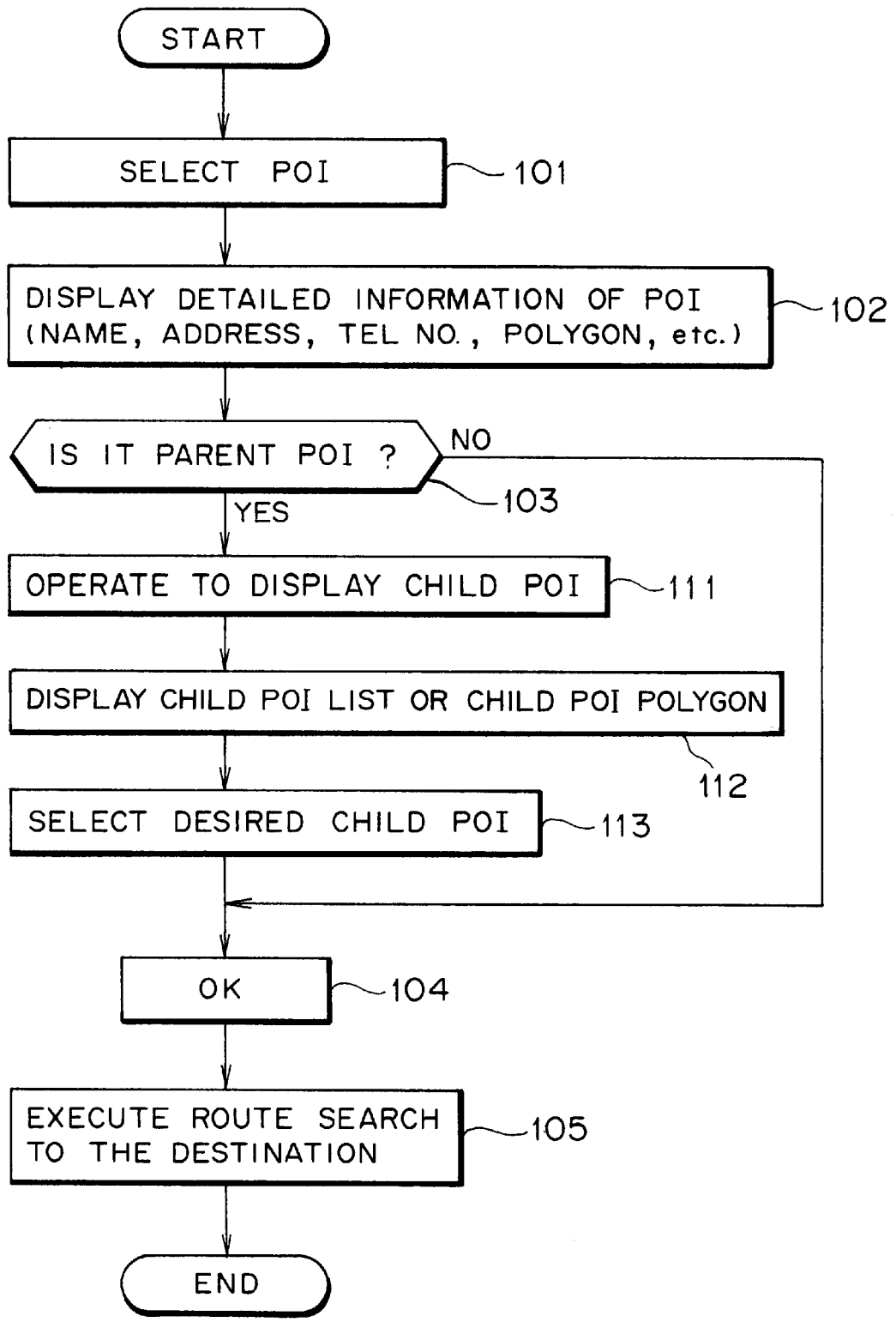
FIG. 5 is a flow chart to input a destination by the Place Type.
Figure 6A:
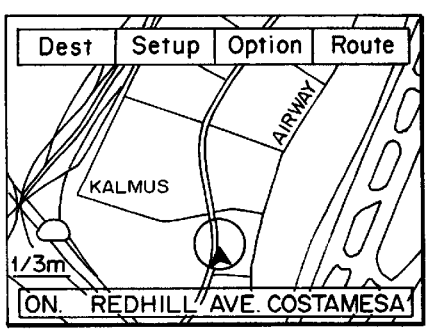
FIGS. 6A–G are illustrations explaining the operation to input a destination in accordance with the category of the destination POI.
Figure 6B:
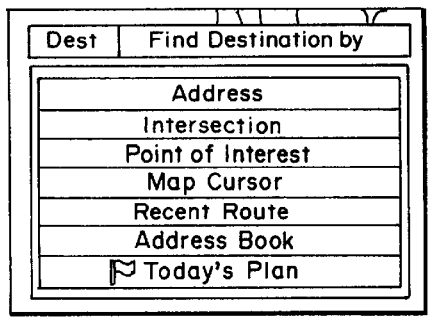
Figure 6C:
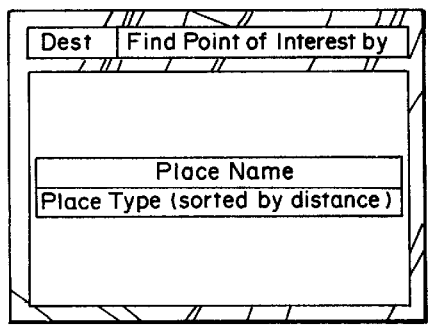
Figure 6D:
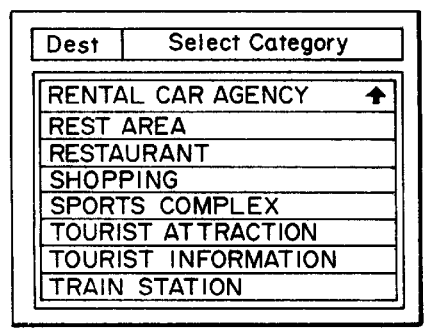
Figure 6E:
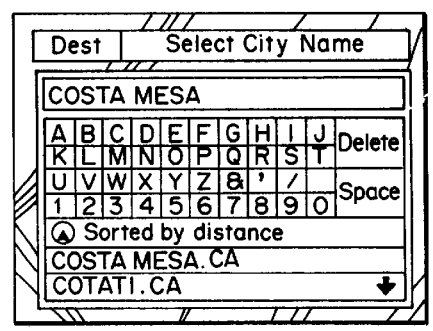
Figure 6F:
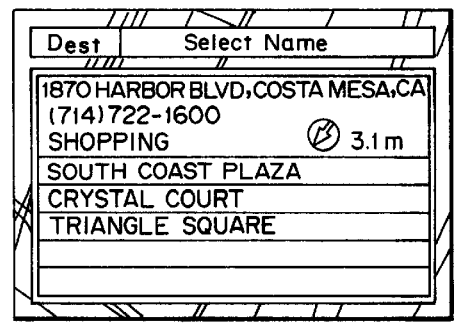
Figure 6G:
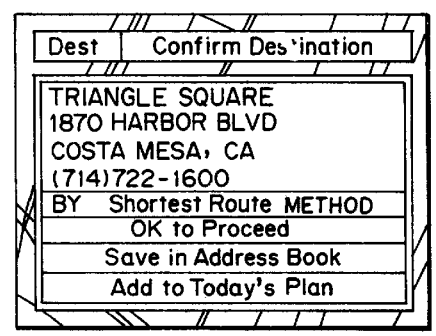

FIG. 5 is a flow chart of the destination input processing in one embodiment of the present invention.

The user inputs "shopping" as a category through the operation explained in FIG. 6, and selects a specific POI (for example, AAA shopping center) from the POI list (step 101). When AAA shopping center is selected as a POI, as shown in FIG. 3(*b*), the navigation system displays the name (AAA shopping center), address, telephone number, category (shopping), information on whether a child POI is available, and configuration (polygon) of the POI on the monitor screen (step 102).

Next, whether the selected POI is a parent POI, in other words, whether a child POI is present is determined (step 103). If it is not a parent POI, or if there is not any child POI, the navigation system will execute a decisive operation to set the selected POI as a destination (step 104). Based on the decisive operation, the navigation system searches a route to the POI as the destination (step 105).

On the other hand, if the selected POI is a parent POI and has a child POI (AAA shopping center is a parent POI), and if the user moves the joy stick key 16a to the right (step 111), the navigation system will display a list of the child POIs (names of tenants), as shown in FIG. 3(*c*) (step 112). Next, if the joy stick 16a is moved to the upper and lower side, the names of the tenants will be scrolled on the display, and a desired child POI can be selected (step 113). Next, if the user executes the decisive operation for setting the selected child POI as the destination (step 104), the navigation system will start the route search with the child POI as the destination (step 105). If the user selects "* flower shop" from the child POI list, for example, the navigation system will execute the route search for "* flower shop" in the shopping mall as the destination.

The foregoing processing shows a case in which a child POI list is displayed at step 112 (FIG. 3(*c*)), but the child polygon can also be displayed. For example, if the user selects the Dodgers stadium as the POI (step 101), the navigation system will display the name (the Dodgers stadium), address, telephone number, category (baseball stadium), information on whether a child POI is available, and configuration (polygon) of the POI, as shown in FIG. 4(*b*) (step 102).

Next, whether the selected POI is a parent POI, in other words, whether a child POI is present is determined (step 103). If a child POI is available (the Dodgers stadium is a parent POI), and if the user moves the joy stick key 16a to the right (step 111), the navigation system will display the child POIs (parking lots) by polygon, and also display the linked polygons, as shown in FIG. 4(*c*) (step 112). Here, if the user selects the first parking lot polygon (step 112), the navigation system will execute the route search that guides the user to the first parking lot in the Dodgers stadium.

(D) Modified Embodiments

Figure 4C:
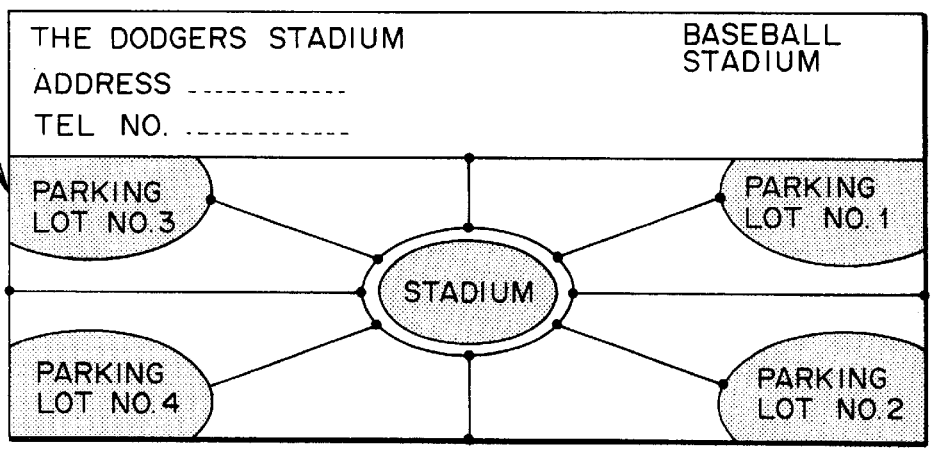

The system may also be configured in the following manner. When a stadium is selected as a POI, for example, the display as shown in FIG. 4(*b*) is presented, and a check is made to determine whether a child POI is available. If available, whether the child POI is a parking lot is checked; and when a parking lot is available as the child POI, an inquiry "would you like to go to the parking lot?" is displayed. The display as shown in FIG. 4(c) is presented in response to the input "YES". Further, the system may also be configured such that the parking lot data which were not selected are stored, and when the selected parking lot is fully occupied, another parking lot is accessed to perform the route search.

The system may also be configured such that, when the Tokyo station (parent POI) is selected as the POI, Marunouchi-guchi, Yaesu-guchi, etc., which are the entrance and exit (child POIs) connecting to the Tokyo station, are displayed by polygon. The Marunouchi-guchi polygon, for example, can be selected to set it as the destination. Furthermore, the system may also be configured such that, when a theme park, for example, Korakuen (parent POI) is selected, the polygons of the child POIs, such as an off-track betting office, an amusement park, stations, etc., are displayed, and a specific polygon can be selected to set the destination.

Thus, according to the invention, if a selected POI is a parent POI, the system will be able to display related child POI information, and to set the related child POI as the destination.

As many different embodiments of the present invention can be made without departing from the spirit and scope thereof, it is to be understood that the invention is not limited to the specific embodiments thereof except as defined in the appended claims.

What is claimed is:

1. A method of selecting a destination in a navigation system by Point of Interest (POI), comprising:

displaying a POI list including parent POIs with which are associated at least one child POI;

selecting a POI from the POI list and displaying information relating to the selected POI, including whether the selected POI is a parent POI;

displaying for a selected parent POI polygon data of child POIs; and selecting a child POI from the polygon of the child POI.

2. A destination selecting method as claimed in claim 1, wherein the POI list is displayed as a result of selecting a category from a list of categories.

3. A destination selecting method as claimed in claim 1, wherein, when a parent POI is selected from the POI list, a polygon of the parent is displayed.

4. A destination selecting method as claimed in claim 1, wherein, when the POI is a parent, link data of child POIs and also names of child POIs are stored.

5. A destination selecting method as claimed in claim 1, wherein a child POI is displayed with a polygon, and the polygons of multiple child POIs are displayed in linked fashion.

6. A destination selecting method as claimed in claim 1, wherein a route search is executed with the selected POI as the destination.

7. A destination input method as claimed in claim 1, wherein the selected parent POI is a shopping mall and the child POI is a tenant in the shopping mall.

8. A destination input method as claimed in claim 1, wherein the child POI is an entrance or exit associated with the selected parent POI.

9. An on-vehicle navigation system that displays POIs (Points of Interest) in the form of a list, and selects a destination POI from the POI list to thereby input a destination, the on-vehicle navigation system comprising:

a POI database containing, for each POI, information such as polygon data, address, position, and, if the POI is a parent, polygon data of associated child POIs, and a control unit that displays, when a parent POI is selected from the POI list, the information and a polygon of the parent, and displays the polygon of a child POI on request.

10. An on-vehicle navigation system as claimed in claim 9, wherein parent POI information displayed by the control unit includes information indicating whether the parent POI possesses a child POI.

11. An on-vehicle navigation system as claimed in claim 9, wherein the control unit displays the child POI with a polygon, and displays the polygons of multiple child POIs in a linked fashion.

12. An on-vehicle navigation as claimed in claim 9 wherein the control unit executes a route search for a child POI selected as a destination.

* * * * *